(12) United States Patent
Hsieh et al.

(10) Patent No.: US 8,942,110 B2
(45) Date of Patent: Jan. 27, 2015

(54) METHOD FOR DETERMINING CONNECTION STATUS OF WIRED NETWORK

(75) Inventors: Meng-Han Hsieh, Hsin-Chu (TW); Chi-Shun Weng, Tainan Hsien (TW); Liang-Wei Huang, Taipei (TW); Ming-Je Li, Yilan County (TW)

(73) Assignee: Realtek Semiconductor Corp., Hsinchu (TW)

( * ) Notice: Subject to any disclaimer, the term of this patent is extended or adjusted under 35 U.S.C. 154(b) by 882 days.

(21) Appl. No.: 11/682,889

(22) Filed: Mar. 7, 2007

(65) Prior Publication Data
US 2007/0211643 A1 Sep. 13, 2007

(30) Foreign Application Priority Data
Mar. 7, 2006 (TW) .............................. 95107596 A

(51) Int. Cl.
*G01R 31/08* (2006.01)
*H04L 12/66* (2006.01)
*H04L 12/24* (2006.01)

(52) U.S. Cl.
CPC ............... *H04L 12/66* (2013.01); *H04L 41/12* (2013.01)
USPC ........................................................ 370/250

(58) Field of Classification Search
USPC ................................................ 370/466, 296
See application file for complete search history.

(56) References Cited

U.S. PATENT DOCUMENTS

| | | | |
|---|---|---|---|
| 6,580,697 B1 * | 6/2003 | Gardner et al. ............... | 370/296 |
| 6,600,755 B1 * | 7/2003 | Overs et al. .................. | 370/465 |
| 6,697,768 B2 * | 2/2004 | Jones et al. ................... | 702/189 |
| 6,996,125 B2 * | 2/2006 | Kfir et al. ..................... | 370/466 |
| 7,054,947 B2 * | 5/2006 | Yun .............................. | 709/233 |
| 7,366,930 B2 * | 4/2008 | Gutman et al. ............... | 713/320 |
| 7,414,410 B2 * | 8/2008 | Pharn et al. .................. | 324/534 |
| 7,420,938 B2 * | 9/2008 | Scaglione et al. ............ | 370/296 |
| 7,561,980 B2 * | 7/2009 | Yen et al. ...................... | 702/117 |
| 2002/0123350 A1 * | 9/2002 | Bui ............................... | 455/450 |
| 2003/0191854 A1 * | 10/2003 | Hsu et al. ..................... | 709/233 |
| 2004/0032921 A1 * | 2/2004 | Bui ............................... | 375/350 |
| 2005/0055456 A1 * | 3/2005 | Chalupsky et al. .......... | 709/233 |
| 2005/0165959 A1 * | 7/2005 | Huff ............................. | 709/238 |
| 2005/0243903 A1 * | 11/2005 | Agazzi .......................... | 375/219 |
| 2006/0059287 A1 * | 3/2006 | Rivard et al. ................ | 710/300 |
| 2006/0187845 A1 * | 8/2006 | Busi et al. .................... | 370/244 |
| 2007/0022331 A1 * | 1/2007 | Jamieson et al. ............ | 714/712 |

OTHER PUBLICATIONS

Design considerations for gigabit Ethernet 1000Base-T twisted pair transceivers. Hatamian,IEEE 1998 Custom Integrated Circuits Conference.

* cited by examiner

*Primary Examiner* — Jung-Jen Liu
(74) *Attorney, Agent, or Firm* — McClure, Qualey & Rodack, LLP

(57) ABSTRACT

A method applied to a wired network including a first network device and a second network device is disclosed. The first and second network devices each include a first set of connection ends and a second set of connection ends. Firstly, the first network device transmits a specific signal pattern through its first set and second set of connection ends. Then, the first network device detects whether a signal is received at its first set and second set of connection ends. If it is determined that a signal is not received at the first set connection ends while a signal is received at the second set connection ends, the first network device determines that its second set of connection ends is not correctly coupled to the second set of connection ends of the second network device.

12 Claims, 3 Drawing Sheets

METHOD FOR DETERMINING CONNECTION STATUS OF WIRED NETWORK

BACKGROUND OF THE INVENTION

1. Field of the Invention

The present invention relates to wired networks, and more particularly, to a method for determining the connection status of a wired network.

2. Description of the Prior Art

An Ethernet network can usually support a variety of communicating bit rate modes, such as: 10 Mbps mode, 100 Mbps mode, and 1 Gbps mode.

Furthermore, two Ethernet networks can communicate with each other through the coupling of twist pairs. Under the 10 Mbps and 100 Mbps modes, two Ethernet networks can work properly by simply coupling two twist pairs between the two Ethernet networks; however, under a 1 Gbps mode, four twist pairs have to be coupled between the two Ethernet networks in order to make the two Ethernet networks work properly.

FIG. 1 is a diagram illustrating a prior art wired network. The wired network 100 is an example of the above-mentioned Ethernet network. The wired network 100 comprises a first network device 110 and a second network device 150. Both the first network device 110 and the second network device 150 are capable to communicate under the 1 Gbps mode. Furthermore, both the first network device 110 and the second network device 150 can support communication below 1 Gbps, which is 10 Mbps or 100 Mbps. The first network device 110 comprises a first set of connection ends 120 (which comprise a first connection end 122 and a second connection end 124) and a second set of connection ends 130 (which comprise a third connection end 132 and a fourth connection end 134). Similarly, the second network device 150 comprises a first set of connection ends 160 (which comprise a first connection end 162 and a second connection end 164) and a second set of connection ends 170 (which comprise a third connection end 172 and a fourth connection end 174). Under the 1 Gbps mode, the four connection ends 122, 124, 132, 134 of the first network device 110 have to couple to the four connection ends 162, 164, 172, 174 of the second network device 150 through a pair of twist pairs, then the first network device 110 and the second network device 150 can communicate with each other properly.

More precisely, when the wired network 100 starts to establish a data transmission channel, the first network device 110 and the second network device 150 will first utilize the first set of connection ends 120 and 160 to mutually transmit the link pulse to confirm the communication ability of both devices. When both devices are confirmed to have communication ability under the 1 Gbps mode, and the first network device 110 is assumed to serve as the first network device and the second network 150 is assumed to serve as the second network device. The first network device 110 then utilizes the first and second set of connection ends 120, 130 to transmit an idle pattern to the first and second set of connection ends 160, 170 of the second network device 150. If the second network device 150 successfully receives the idle pattern from the first and second set of connection ends 160, 170, then the second network device 150 also can utilize the first and second connection ends 160, 170 to transmit the idle pattern to the first and second set of connection ends 120, 130 of the first network device 110. Then, the first and second network devices 110, 150 can establish communication under the 1 Gbps mode.

However, for the wired network 100, the physical communicating path between the first network device 110 and the second network device 150 may not conform to the requirement of the 1 Gbps mode. For example, one possible situation is when the first set of connection ends 160 of the second network device 150 is correctly coupled to the first set of connection ends 120 of the first network device 110, but the second set of connection ends 130 of the first network device 110 is not correctly coupled to the second set of connection ends 170 of the second network device 150. Therefore, in the above-mentioned situation, although the first and second network devices 110, 150 can utilize the first set of connection ends 120 and 160 to confirm that both connection ends have communication ability with each other under 1 Gbps mode, the second set of connection ends 130 and 170 are not coupled correctly. Therefore, the first and second network devices 110, 150 still cannot establish the real 1 Gbps communication with each other. Furthermore, at the mean time, the first and second network devices 110, 150 will keep trying to establish the communicating mode of 1 Gbps mode, but will not succeed due to the incorrect connection.

SUMMARY OF THE INVENTION

Therefore, one of the objectives of the present invention is to provide a method for determining the connection status of a wired network to resolve the above-mentioned problem.

One of the objectives of the present invention is to provide a method for determining the connection status of a wired network to determine the communicating mode of the wired network according to the status of the communicating path.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
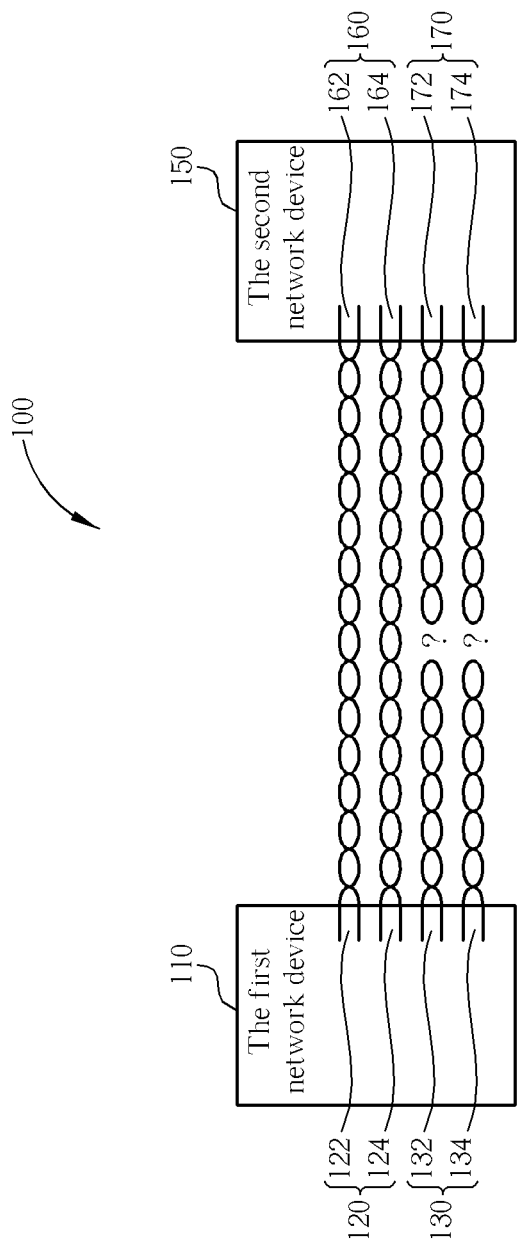
FIG. 1 is a diagram illustrating a prior art wired network.

The method of the present invention can be utilized in the wired network 100 as shown in FIG. 1, and it is assumed in the following description that the first and second network devices 110, 150 are capable to communicate under 1 Gbps mode.

Figure 2:
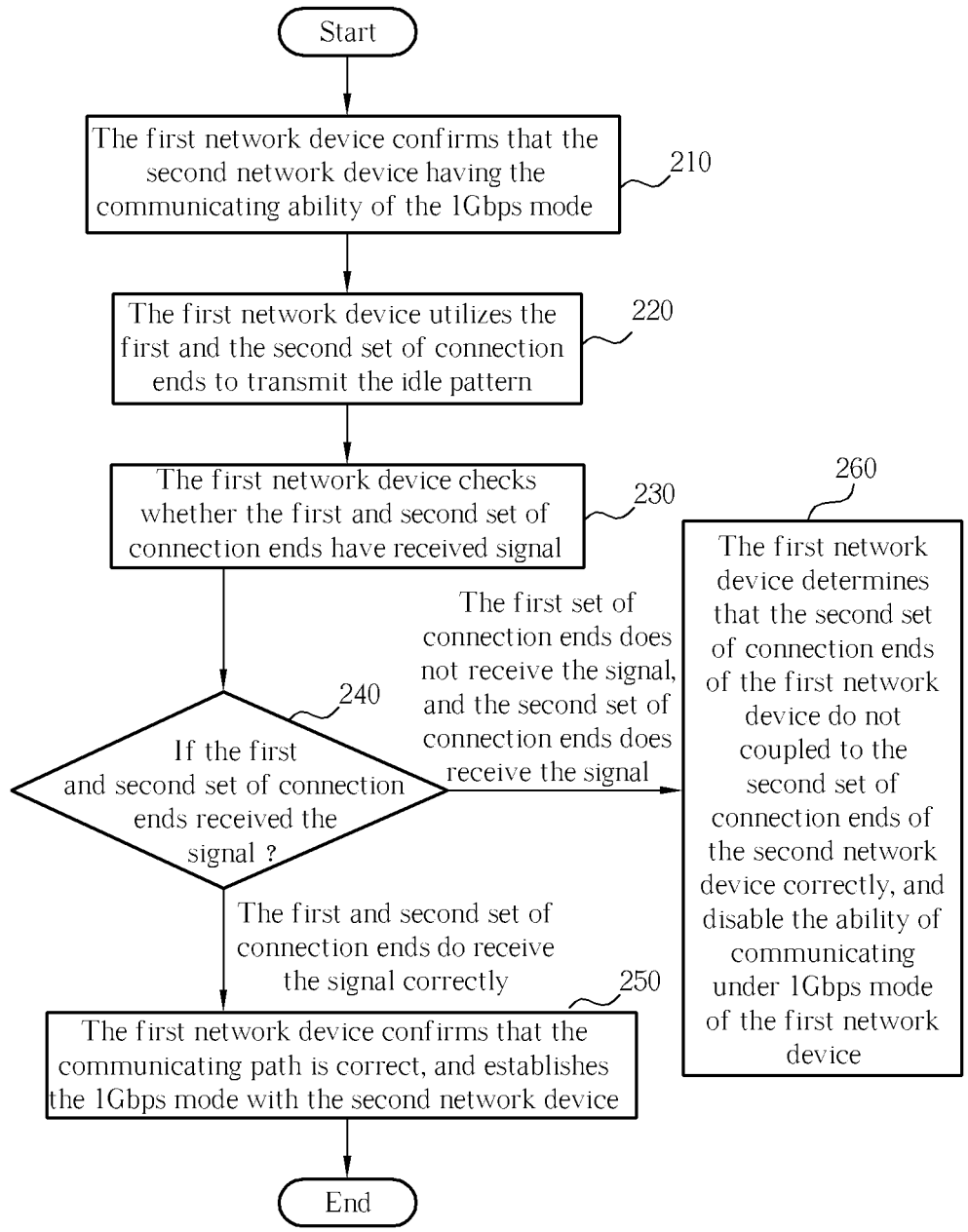
FIG. 2 is a flow chart of an operation of a first network device according to an embodiment of the present invention.

FIG. 2 is a flow chart of the operation of the first network device 110 according to an embodiment of the present invention. First, in the step of 210, the first network device 110 utilizes the first set of connection ends 120 to mutually transmit the link pulse with the second network device 150 in order to confirm the communication ability between the network devices 110 and 150. Meanwhile, as the first set of connection ends 120 and 160 are coupled with each other, the first network device 110 confirms that the second network device 150 has communication ability under 1 Gbps mode. In step 220, the first network device 110 utilizes the first and the second set of connection ends 120, 130 to transmit the idle pattern. In step 230, the first network device 110 checks whether the first and second set of connection ends 120, 130 have received the signal. As the first and second set of connection ends 120, 130 of the first network device 110 are correctly coupled to the first and second set of connection ends 160, 170 of the second network device 150, the second network device 150 can correctly receive the idle pattern. Similarly, the second network device 150 also utilizes the first and second set of connection ends 160, 170 to transmit the idle pattern. Therefore, if the first network device 110 detects that both the first and second set of connection ends 120, 130 of the first network device 110 have received the signal, then the first network device 110 can proceed to step 250 to confirm that the path is correct.

If the second set of connection ends 130 of the first network device 110 are not coupled to the second set of connection ends 170 of the second network device 150 correctly, then the second network device 150 will not receive the idle pattern correctly, and therefore the second network device 150 will not return the idle pattern through the first and the second set of connection ends 160, 170. However, as the second set of connection ends 130 is not coupled to the second set of connection ends 170 correctly, when the first network device 110 transmits the idle pattern, the signal transmitted by the second set of connection ends will be reflected. Therefore, even though the second network device 150 does not return the signal, the first network device 110 will detect that the second set of connection ends 130 of the first network device 110 has received the signal (reflected signal), and detects that the first set of connection ends 120 of the first network device 110 has not received the signal. Meanwhile, the first network device 110 proceeds to step 260, and determines that the second set of connection ends of the first network device 110 are not coupled to the second set of connection ends of the second network device 150 correctly, and disables the communication ability under 1 Gbps mode of the first network device 110. After step 260, the first network device 110 can re-try establishing connectivity with the second network device 150 while the communication ability under 1 Gbps mode is disabled. If the first network device 110 and the second network device 150 have established the communicating mode of the 10 Mbps mode or the 100 Mbps mode, then the first network device 110 can cancel the disable order of the communicating mode of the 1 Gbps mode (i.e. un-disable the communication ability under 1 Gbps mode of the first network device 110). Therefore, once the second set of connection ends 130 are coupled to the second set of connection ends 170 correctly, the communicating mode of 1 Gbps can then be set.

Figure 3:
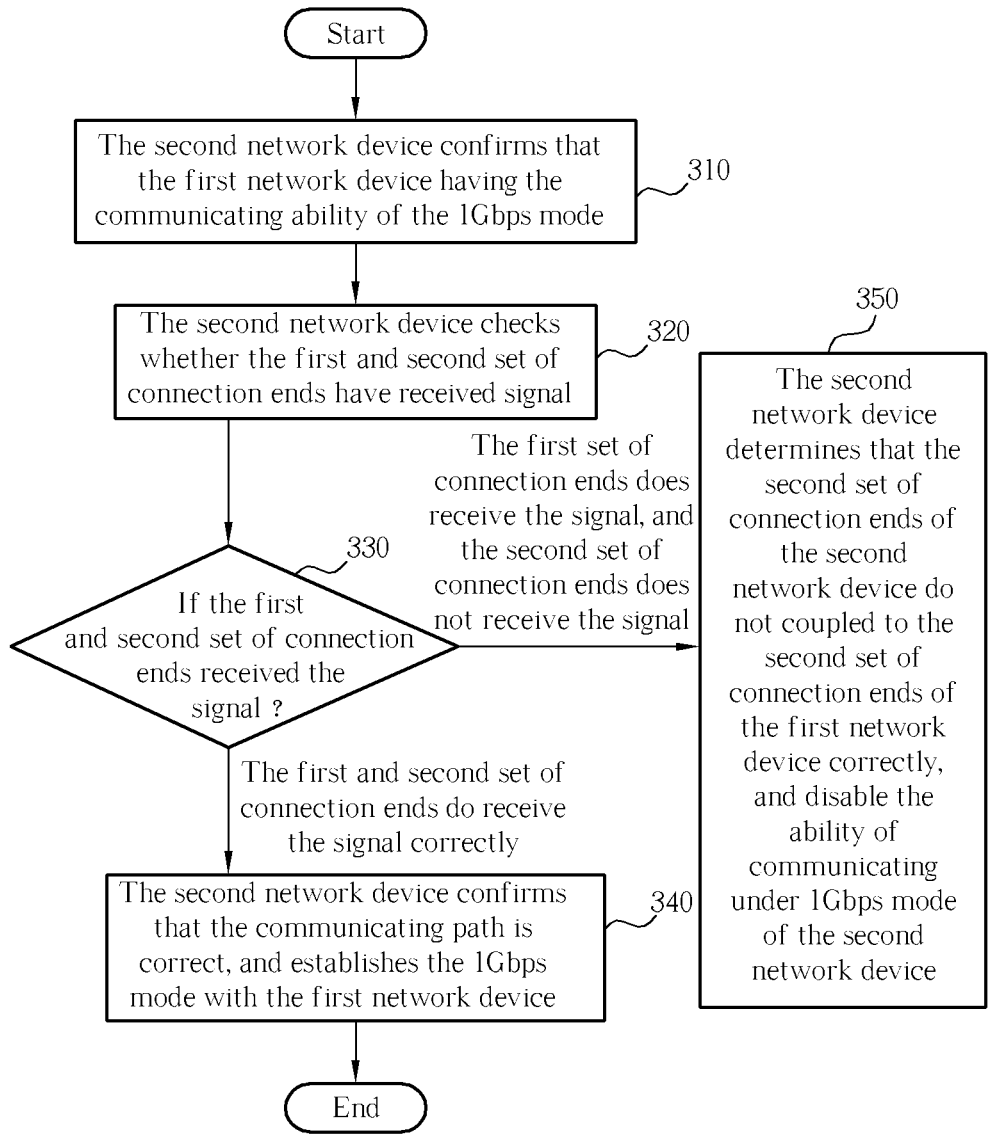
FIG. 3 is a flow chart of an operation of a second network device according to an embodiment of the present invention.

FIG. 3 is a flow chart of the operation of the second network device 150 according to an embodiment of the present invention. First, in the step 310, the second network device 150 utilizes the first set of connection ends 160 to mutually transmit a link pulse with the first network device 110 to share the communication ability between the network devices 150 and 110. Meanwhile, as the first set of connection ends 160 and 120 are coupled with each other, the second network device 150 confirms that the first network device 110 has communication ability under 1 Gbps mode. In step 320, the second network device 150 checks the first and the second set of connection ends 160, 170 to determine if the first and the second set of connection ends 160, 170 have received the signal. As the first and second set of connection ends 160, 170 of the second network device 150 are correctly coupled to the first and second set of connection ends 120, 130 of the first network device 110, the second network device 150 can correctly receive the idle pattern transmitted by the first network device 110. Therefore, if the second network device 150 detects that both the first and second set of connection ends 160, 170 of the second network device 150 have received the signal, then the second network device 150 can proceed to step 340 to confirm that the path is correct. Then, the second network device 150 returns the idle pattern to the first network device 110 and shares the communicating mode of 1 Gbps with the first network device 110.

If the second set of connection ends 170 of the second network device 150 are not coupled to the second set of connection ends 130 of the first network device 110 correctly, then the second network device 150 can only receive the signal at the first set of connection ends 160 correctly, while the second set of connection ends 170 will not receive the signal correctly. Therefore, if the second network device 150 detects that the first set of connection ends 160 of the second network device 150 receive the signal, and the second set of connection ends 170 do not receive the signal, then the second network device 150 can proceed to step 350. Then the second network device 150 determines that the second set of connection ends 170 of the second network device 150 are not coupled to the second set of connection ends 130 of the first network device 110 correctly, and disables the communication ability under 1 Gpbs mode. After the step 350, the second network device 150 can re-try establishing connectivity with the first network device 110 while the communication ability under 1 Gbps mode is disabled. If the second network device 150 and the first network device 110 have established the communicating mode of the 10 Mbps mode or the 100 Mbps mode, then the second network device 150 can cancel the disable order of the communicating mode of the 1 Gbps mode (i.e. un-disable the communication ability of communicating under 1 Gbps mode of the second network device 150). Therefore, once the second set of connection ends 130 are coupled to the second set of connection ends 170 correctly, the communicating mode of the 1 Gbps mode can then be set.

Please note that those skilled in this art will readily know that, although the above-mentioned first and second network devices 110, 150 are the first network device and the second network device respectively, the first and second network devices 110, 150 can also be the second network device and the first network device respectively. In other words, when the first and second network devices 110, 150 are the second network device and the first network device respectively, the first network device 110 decides the state of network connectivity according to the method as shown in FIG. 3; and the second network device 150 decides the state of network connectivity according to the method as shown in FIG. 2. Furthermore, determining whether the first and second network devices 110, 150 are the first and second network devices respectively, or the second and first network devices respectively is prior art, and the detailed description is therefore omitted here for brevity.

According to the above-mentioned disclosure, when the connection between the first and second network devices 110, 150 conforms to the requirements of 1 Gbps mode (i.e. both devices coupled with each other through four twist pairs correctly), the first and second network networks 110, 150 can share the network communicating of 1 Gbps mode. When the connection between the first and second network devices 110, 150 does not conform to the requirements of 1 Gbps mode (i.e. both devices are coupled with each other through four twist pairs incorrectly), the first and second network networks 110, 150 will disable the communication ability under 1 Gbps mode, and try to establish the connection mode of 10 Mbps mode or 100 Mbps mode with each other.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method applied in a wired network, the wired network comprising a first network device and a second network device, the first and second network devices each comprising a first set of connection ends and a second set of connection ends, the first set of connection ends of the first network device coupled to the first set of connection ends of the second network device, the method comprising:

transmitting, by the first network device, a specific pattern signal through the first set and second set of connection ends of the first network device to the second network device;

responsive to not receiving, by the first network device, a return signal from the second network device at both the first and second connection ends, determining, by the first network device, a connection status of both the first and second set of connection ends of the first network device based on detecting whether reflected signals are received at the first set and second set of connection ends of the first network device, wherein if the first network device detects that a reflected signal is not received at the first set of connection ends of the first network device, and detects that a reflected signal is received at the second set of connection ends of the first network device, the first network device determines that the first set of connection ends of the first network device is correctly coupled to the first set of connection ends of the second network device and that second set of connection ends of the first network device is not correctly coupled to the second set of connection ends of the second network device;

if the first network device determines that the second set of connection ends of the first network device is not correctly coupled to the second set of connection ends of the second network device, disabling a communication ability of the first network device under a first bit-rate mode by utilizing the first network device and enabling a communication ability of the first network device under a second bit-rate mode by utilizing the first network device.

2. The method of claim 1, wherein the wired network is an Ethernet network, and the specific pattern signal is an idle pattern.

3. The method of claim 1, wherein the first bit-rate mode is a Gbps mode.

4. The method of claim 1, wherein the first bit-rate mode is a Gbps mode and the second bit-rate mode is a 10 Mbps mode or 100 Mbps mode.

5. A method applied in a wired network comprising a first network device and a second network device, the first and second network devices each comprising a first set of connection ends and a second set of connection ends, the first set of connection ends of the first network device coupled to the first set of connection ends of the second network device, the method comprising:

responsive to confirming that the first network device has a communication ability under a first bit-rate mode using the first set of connection ends of the first and second network devices and responsive to the first network device transmitting link signals to the first set of connection ends and the second set of connections ends of the second network device, detecting, by the second network device, whether link signals are received at the first set and second set of connection ends of the second network device; and determining a connection status of both the first and second set of connection ends of the second network device wherein, if the second network device detects that a link signal is received at the first set of connection ends of the second network device, and detects that a link signal is not received at the second set of connection ends of the second network device, determining, by the second network device, that the first set of connection ends of the second network device is correctly coupled to the first set of connection ends of the first network device and that the second set of connection ends of the second network device is not correctly coupled to the second set of connection ends of the first network device;

if the second network device determines that the second set of connection ends of the second network device is not correctly coupled to the second set of connection ends of the first network device, disabling the communication ability of the second network device under the first bit-rate mode by utilizing the second network device and enabling the communication ability of the second network device under the second bit-rate mode by utilizing the second network device.

6. The method of claim 5, wherein the wired network is an Ethernet network, and the first bit-rate mode is a Gbps mode.

7. The method of claim 5, wherein the first bit-rate mode is a Gbps mode and the second bit-rate mode is a 10 Mbps mode or 100 Mbps mode.

8. A method for determining connectivity of a wired network, comprising:

designating a first network device to operate as one of a master network device or a slave network device, wherein the first network device comprises a first set of connection ends and a second set of connection ends;

responsive to the first network device being designated as the master network device, then executing the following steps:

transmitting a first signal through the first set and second set of connection ends by the first network device to a second network device;

responsive to not receiving, by the first network device, a return signal from the second network device at both the first and second connection ends, determining, by the first network device, a connection status of both the first and second set of connection ends of the first network device based on detecting whether reflected signals are received at the first set and second set of connection ends; and responsive to the first network device detecting that a reflected signal is not received at the first set of connection ends, and detecting that a reflected signal is received at the second set of connection ends, disabling a communication ability of the first network device under a first bit-rate mode and enabling the communication ability of the first network device under a second bit-rate mode; and responsive to the first network device being designated as the slave network device, then executing the following steps:

detecting whether a second signal is received at the first set and second set of connection ends by the first network device; and responsive to the first network device detecting that a link signal is received at the first set of connection ends, and detecting that a link signal is not received at the second set of connection ends, disabling the communication ability of the first network device under a first bit-rate mode and enabling the communication ability of the first network device under the second bit-rate mode;

wherein both the first network device and the second network device have the communication ability under the first bit-rate mode.

9. The method of claim 8, wherein the first signal and the second signal each comprises a specific pattern.

10. The method of claim 9, wherein the wired network is an Ethernet network, and the specific pattern signal is an idle pattern.

11. The method of claim 8, wherein the first bit-rate mode is a Gbps mode.

12. The method of claim 11 wherein the second bit-rate mode is a 10 Mbps mode or 100 Mbps mode.

* * * * *